UNITED STATES PATENT OFFICE.

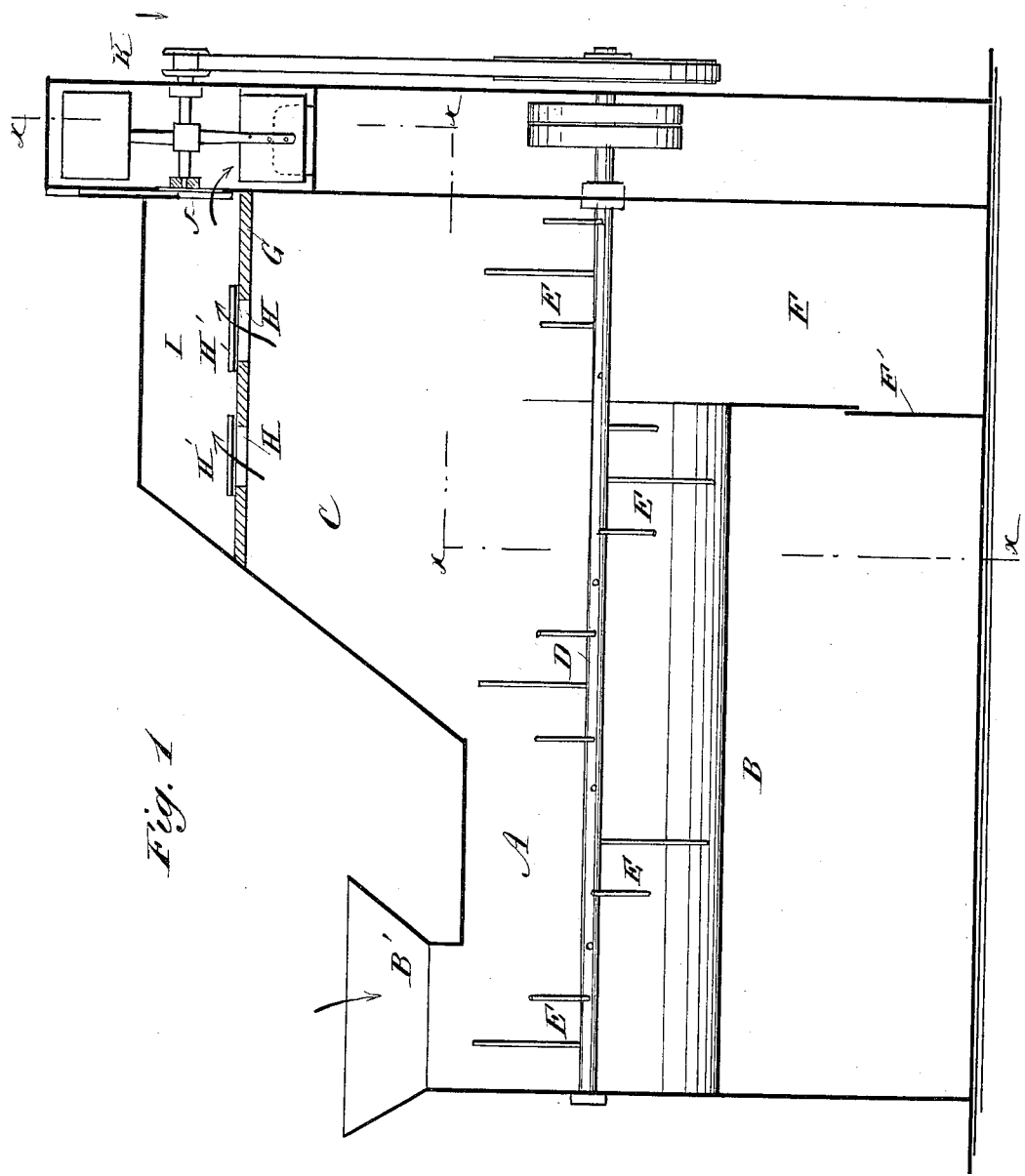

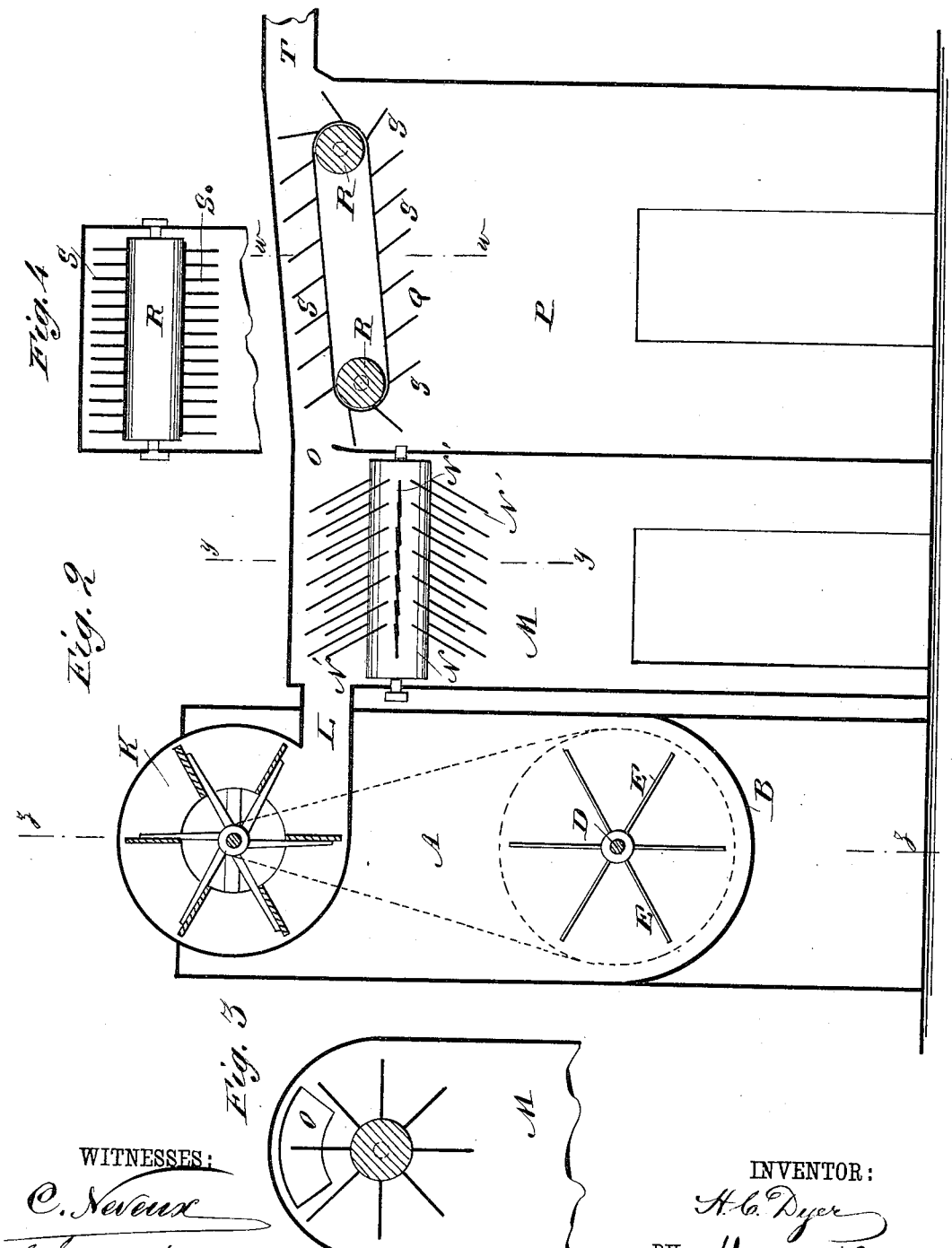

HENRY C. DYER, OF ST. LOUIS, MISSOURI.

MACHINE FOR SORTING FEATHERS.

SPECIFICATION forming part of Letters Patent No. 320,342, dated June 16, 1885.

Application filed December 15, 1884. (No model.)

*To all whom it may concern:*

Be it known that I, HENRY C. DYER, of St. Louis, Missouri, have invented a new and Improved Machine for Picking and Sorting Feathers, of which the following is a full, clear, and exact description.

The object of my invention is to provide a new and improved machine for picking and sorting feathers by gravity.

For carrying out my invention I provide devices which consist in a chamber provided with means for agitating the feathers, and with a blower for creating a draft or current of air which raises the feathers and carries off the lighter ones, the heavier feathers dropping into a pit or well, from which they are removed, again agitated and subjected to the current of air. Rollers and belts having pins are provided, over which the feathers are conducted, the larger feathers catching on the pins or striking them and dropping down.

Reference is to be had to the accompanying drawings, forming part of this specification, in which similar letters of reference indicate corresponding parts in all the figures.

Figure 1 is a longitudinal sectional elevation of my improved machine for picking feathers, on the line $z\ z$, Fig. 2. Fig. 2 is a cross-sectional view on the line $x\ x$, Fig. 1. Fig. 3 is a cross-sectional view on the line $y\ y$, Fig. 2. Fig. 4 is a cross-sectional view on the line $w\ w$, Fig. 2.

A chamber, A, having a half-round bottom, B, is provided at one end with a hopper, B', and at the other end with a raised compartment, C.

A shaft, D, journaled in the lower part of the chamber A extends longitudinally over the half-round bottom, and on the said shaft rods or sticks E are arranged on a spiral or irregular line, the free ends of the sticks being a short distance from the curved bottom.

At the inner end of the chamber A a well or shaft, F, is provided, having a draft-opening, F', which can be closed more or less by means of a gate.

In the top of the compartment C, I have provided a horizontal partition, G, having a series of openings, H, closed by upwardly-swinging valves H' on the upper side of the said partition.

From the chamber I, above the partition G, an opening, J, leads to the casing of a blower or revolving fan, K, from which a spout, L, leads into the top of a chamber, M, in which a roller, N, is journaled parallel with and slightly below the spout, and on which roller a series of pins, N', are secured and inclined toward the end of the spout L.

An opening, O, leads from the upper part of the chamber M into the top of chamber P, in which an endless belt, Q, passes over two rollers, R, the belt being slightly inclined upward.

On the belt Q a series of rows of pins, S, are secured at an inclination to face of the belt.

The chambers M and P are provided at their bottoms with doors.

The chamber P is provided with an outlet-opening, T, opposite the inlet-opening O leading into a room or chamber.

The operation is as follows: The feathers are placed in the hopper B', and drop from the same upon the shaft D, and are agitated and thrown about in the chamber A by the sticks E. The machine is operated quite slowly. The rising current of air carries the feathers upward and through the openings H, the valves H' being raised, and they pass into the chamber I. The partition G serves to distribute the draft. The down and light feathers only are drawn upward, and the coarser feathers drop down into the well or pit F. The fine feathers and down pass over the roller N, over the belt Q, and through the opening T into a suitable chamber or room. The machine can then be started up at a higher speed, and the feathers that have dropped into the well or pit F placed into the hopper B' and again drawn upward by the current of air, the heavier quills, feathers, &c., again dropping into the well or pit F. As some of the quills or feathers raised by the current of air are too coarse, they strike the pins N' on the roller N, or the pins S on the belt Q and drop down, or they catch between the pins and drop when the pins project downward.

The arrangement of the fan and chamber, and of the rollers and belts carrying the pins, can be changed in various ways; but in all cases they must be so arranged that the feathers are forced over the pins so as to hold back the quills, coarse feathers, &c., and the chamber arranged so that the draft is through the agitated feathers, carrying away the lighter ones. Several machines may be placed together, one taking the droppings from the other instead of running them over through the same machine, and the several parts may be, if desired, arranged on different floors and connected by pipes.

Having thus described my invention, what I claim as new, and desire to secure by Letters Patent, is—

1. A machine for picking and assorting feathers, provided with a chamber containing means for agitating the feathers, a blower for producing a current of air, and chambers provided with movable obstructions over which the feathers are carried, substantially as herein shown and described.

2. In a machine for picking and assorting feathers, the combination, with a device for agitating the feathers, of the blower K, and the partition G, having openings H H, substantially as herein shown and described.

3. In a machine for picking and assorting feathers, the combination, with the chamber A, of a device for agitating the feathers, the partition G, having apertures H, the blower K, and of belts and rollers provided with pins held at inclinations to the surfaces of the belts and rollers, and through and over which pins the feathers are carried, substantially as herein shown and described.

HENRY C. DYER.

Witnesses:
 D. A. DICE,
 CONRAD DEAMM.